United States Patent
Zhu et al.

(10) Patent No.: US 9,529,174 B2
(45) Date of Patent: Dec. 27, 2016

(54) DIFFUSER PLATE ASSEMBLY, BACKLIGHT AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hongli Zhu, Beijing (CN); Lili Jia, Beijing (CN); Zhidan Zhang, Beijing (CN); Daekeun Yoon, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 14/447,936

(22) Filed: Jul. 31, 2014

(65) Prior Publication Data
US 2015/0226888 A1   Aug. 13, 2015

(30) Foreign Application Priority Data
Feb. 13, 2014   (CN) .......................... 2014 1 0050273

(51) Int. Cl.
*G02B 7/00* (2006.01)
*G02F 1/1335* (2006.01)
*G02B 5/02* (2006.01)

(52) U.S. Cl.
CPC ............... *G02B 7/00* (2013.01); *G02B 5/0236* (2013.01); *G02B 5/0278* (2013.01); *G02F 1/133606* (2013.01)

(58) Field of Classification Search
CPC ....... G02B 7/006; G02B 7/021; G02B 5/0236; G02B 5/0278; G02B 7/00; G02F 1/133606
See application file for complete search history.

(56) References Cited

U.S. PATENT DOCUMENTS

| | | | |
|---|---|---|---|
| 5,459,645 A | 10/1995 | Sattler et al. | |
| 6,636,355 B2 * | 10/2003 | Moshrefzadeh | G03B 21/625 359/453 |

(Continued)

FOREIGN PATENT DOCUMENTS

| | | |
|---|---|---|
| CN | 1534345 | 10/2004 |
| CN | 101105601 A | 1/2008 |

(Continued)

OTHER PUBLICATIONS

Chinese Patent Application No. 201410050273.7, Office Action dated Nov. 27, 2015, eight (8) pages, English translation, seven (7) pages.

*Primary Examiner* — Robert May
*Assistant Examiner* — Leah S Macchiarolo
(74) *Attorney, Agent, or Firm* — Nath, Goldberg & Meyer; Joshua B. Goldberg

(57) ABSTRACT

The present invention provides a diffuser plate assembly. The diffuser plate assembly includes a first diffuser plate and a second diffuser plate located under the first diffuser plate, and a gap is formed therebetween. Correspondingly, the present invention also provides a backlight comprising the diffuser plate assembly and a display device comprising the backlight. Compared with the prior art, the diffuser plate assembly provided by the present invention can enable light emitted by a light source to irradiate a display panel more uniformly, and the thicknesses of the backlight and the display device can be reduced.

7 Claims, 2 Drawing Sheets

(56) References Cited

U.S. PATENT DOCUMENTS

| | | | |
|---|---|---|---|
| 7,036,956 B1* | 5/2006 | Chou | G02F 1/133603 |
| | | | 361/742 |
| 2005/0041411 A1* | 2/2005 | Wu | G02F 1/133608 |
| | | | 362/633 |
| 2005/0281050 A1 | 12/2005 | Chou | |
| 2006/0285326 A1* | 12/2006 | Jeon | G02F 1/133605 |
| | | | 362/247 |
| 2008/0019145 A1* | 1/2008 | Cho | G02F 1/133606 |
| | | | 362/601 |
| 2008/0106897 A1* | 5/2008 | Yoon | G02B 3/0056 |
| | | | 362/235 |
| 2008/0111949 A1* | 5/2008 | Shibata | G02F 1/133603 |
| | | | 349/64 |
| 2014/0168766 A1* | 6/2014 | Boyd | G02B 5/0231 |
| | | | 359/485.01 |

FOREIGN PATENT DOCUMENTS

| | | |
|---|---|---|
| CN | 101131442 A | 2/2008 |
| TW | I302217 B | 10/2008 |

* cited by examiner

FIG. 5
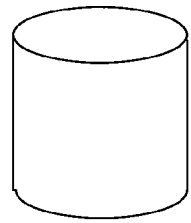
FIG. 6
FIG. 7
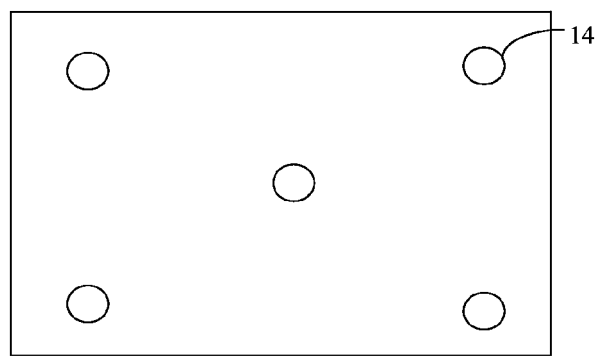
FIG. 8
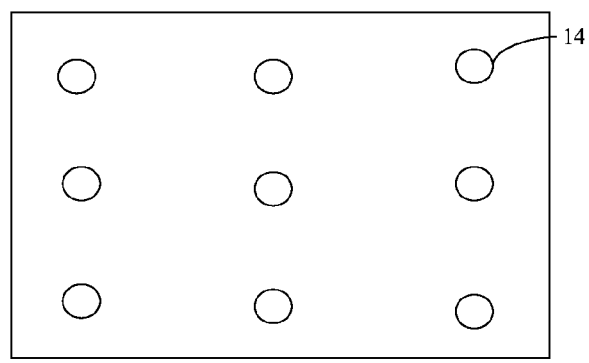

DIFFUSER PLATE ASSEMBLY, BACKLIGHT AND DISPLAY DEVICE

FIELD OF THE INVENTION

The present invention relates to the field of liquid crystal display technology, specifically, relates to a diffuser plate assembly, a backlight and a display device.

BACKGROUND OF THE INVENTION

A backlight located at the back side of a liquid crystal display panel emits light during an operation of a liquid crystal display device, and the emitted light passes through the display panel and then is observed by human eyes. Backlights can be categorized into direct-type backlights and side-edge type backlights, and the direct-type backlights are typically used in large-size liquid crystal displays.

The direct-type backlight is a backlight that provides a plurality of light sources at the back side of the liquid crystal display, and generally there is a diffuser plate provided between the light sources and the display panel to diffuse the light emitted by the light sources uniformly, so that the light emitted by the plurality of light sources can irradiate the display panel uniformly.

What shown in FIG. 1 is a schematic view of the structure of an existing diffuser plate. An upper film sheet layer 2, a middle film sheet layer 3 and a lower film sheet layer 4 are generally provided on a diffuser plate 1, so that the light emitted by the light sources can irradiate the liquid crystal display panel more uniformly. However, because the number of the light sources in a backlight module is limited and a distance exists between these light sources, the light irradiated on the display panel is not uniform in intensity, thereby causing poor quality of the displayed screen. On the other hand, the film layers provided on the diffuser plate easily wrinkle or warp due to being affected by environmental factors, so that the screen displayed on the display panel is not uniform, thereby causing undesirable effects such as Moire fringes.

Thus, how to enable the light emitted by the light sources to irradiate the display panel more uniformly is a technical problem need to be solved in the art.

SUMMARY OF THE INVENTION

The object of the present invention is to provide a diffuser plate assembly, a backlight and a display device, so that the light emitted from the light sources can irradiate the display panel more uniformly, and the thicknesses of the backlight and the display device can be reduced.

To realize the object described above, the present invention provides a diffuser plate assembly including a first diffuser plate and a second diffuser plate located under the first diffuser plate, and a gap is formed between the first diffuser plate and the second diffuser plate.

Preferably, there is at least one support provided between the first diffuser plate and the second diffuser plate, and the support separates the opposed surfaces of the first diffuser plate and the second diffuser plate to form the gap.

Preferably, the support is made of a transparent material.

Preferably, an adhesive material is provided between the first diffuser plate and the support, the first diffuser plate and the support are fixedly connected by using the adhesive material; and/or an adhesive material is provided between the second diffuser plate and the support, the second diffuser plate and the support are fixedly connected by using the adhesive material.

Preferably, a first lock-in member is provided at the end of the support corresponding to the first diffuser plate, and a first groove is provided at a position of the first diffuser plate corresponding to the first lock-in member, the first lock-in member being extended and locked into the first groove; and/or a second lock-in member is provided at the end of the support corresponding to the second diffuser plate, and a second groove is provided at a position of the second diffuser plate corresponding to the second lock-in member, the second lock-in member being extended and locked into the second groove.

Preferably, a plurality of the supports are provided between the first diffuser plate and the second diffuser plate.

Preferably, the height of the gap is ranged from 4 mm to 6 mm.

Preferably, a diffusion film layer is provided on the upper surface of the first diffuser plate.

Accordingly, the present invention further provides a backlight including light sources and a diffuser plate assembly located above the light sources, wherein the diffuser plate assembly is the diffuser plate assembly according to the present invention as described above.

Accordingly, the present invention further provides a display device including a backlight which is the above-described backlight according to the present invention.

In the present invention, there is a gap formed between the first diffuser plate and the second diffuser plate, the light emitted from the light sources located under the second diffuser plate is diffused by the second diffuser plate, and then enters into the gap, after being reflected a plurality of times within the gap, the light is further diffused by the first diffuser plate, so that the distribution of the light is more uniform, therefore improving the quality of the displayed screen. On the other hand, since the diffuser plate assembly can diffuse the light more uniformly, the distance between the diffuser plate assembly and the light sources can be reduced, therefore the thickness of the backlight is reduced, and furthermore, the thickness of the display device is reduced. Meanwhile, since the diffuser plate assembly can diffuse the light more uniformly, the number of the diffusion film layers provided on the diffuser plate assembly can be reduced, so that the wrinkling effects of the diffusion film layers can be reduced, therefore the quality of a product is improved.

BRIEF DESCRIPTION OF THE DRAWINGS

The drawings are for the purpose of further understanding of the present invention, and constitute a part of the description. The drawings are used for explaining the present invention together with the following embodiments, but do not intend to limit the present invention. Wherein:

FIG. 5 is a schematic view showing a shape of a support;

FIG. 6 is a schematic view showing another shape of the support;

FIG. 7 is a schematic view showing an arrangement of the supports within the diffuser plate assembly according to the present invention; and FIG. 8 is a schematic view showing another arrangement of the supports within the diffuser plate assembly according to the present invention.

DETAILED DESCRIPTION OF THE EMBODIMENTS

The embodiments of the present invention will be described clearly and thoroughly in conjunction with the drawings, so that the object, technical solutions and advantages of the present invention will be more apparent. Obviously, the embodiments described herein are only a part of the embodiments of the present invention but not exhaustive. It should be appreciated that all other embodiments obtained by one skilled in the art without any creative effort, based on the embodiments of the present invention described herein, falls within the scope of the present invention. It should be understood that the specific embodiments described herein are only for the purpose of description and illustration, but not for the purpose of limitation.

Figure 1:
FIG. 1 is a schematic view showing the structure of the diffuser plate in prior art.
Figure 2:
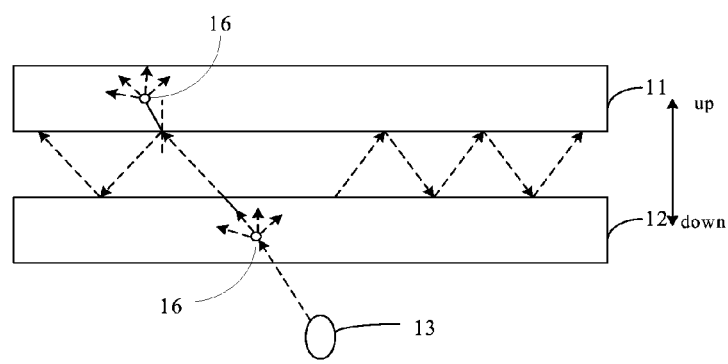
FIG. 2 is a schematic view showing the reflection of the light within the diffuser plate assembly according to the present invention.

As an aspect of the present invention, there is provided a diffuser plate assembly. As shown in FIG. 2, the diffuser plate assembly includes a first diffuser plate 11 and a second diffuser plate 12 located under the first diffuser plate 11, and a gap is formed between the first diffuser plate 11 and the second diffuser plate 12. The function of the gap is: after the light emitted by a light source 13 enters into the gap, the light is reflected a plurality of times within the gap, and then is diffused by the first diffuser plate 11, such that the light distributes more uniformly, therefore improving the quality of the displayed screen. The terms "up" and "down" and their equivalents as used herein represent the directions of "up" and "down" indicated by the solid arrow in FIG. 2.

In a backlight comprising the diffuser plate assembly, a light source 13 is provided under the second diffuser plate 12. The light source 13 is generally a point light source or a line light source. The first and second diffuser plates 11 and 12 are used to distribute the light emitted by the light source 13 more uniformly, that is, the present invention is particularly suitable for the direct-type backlights.

As shown in FIG. 2, the light emitted by the light source 13 enters into the second diffuser plate 12, transmits to diffusion particles 16 in the second diffuser plate 12, and is reflected toward various directions. The light is diffused within the second diffuser plate 12 by the reflection of a plurality of diffusion particles 16. The diffused light is refracted into the gap formed between the first diffuser plate 11 and the second diffuser plate 12. In this gap, at least a portion of the light is reflected a plurality of times between the lower surface of the first diffuser plate 11 and the upper surface of the second diffuser plate 12, so that the distribution of the light is more uniform. When all of the light having been reflected a plurality of times enters into the first diffuser plate 11, the light is distributed more uniformly via the diffusion effects of the diffusion particles 16 in the first diffuser plate 11, therefore the quality of the displayed screen on the liquid crystal display panel is improved. On the other hand, since the uniformity of the light is increased in the present invention, the distance between the second diffuser plate 12 and the light sources can be reduced to minimize the loss of the light compared with the prior art. Furthermore, the distance which can be reduced between the second diffuser plate 12 and the light sources can be larger than the summation of the height of the gap and the thickness of the second diffuser plate 12 (or, the first diffuser plate 11), so that the backlight has a smaller thickness. As a result, a display device including the backlight of the present invention can also have a smaller thickness.

In present invention, a forming method of the gap between the first diffuser plate 11 and the second diffuser plate 12 is not limited. For example, a support can be provided between the first diffuser plate 11 and the second diffuser plate 12. Alternatively, the first diffuser plate 11 and the second diffuser plate 12 can be fixed by a fixing frame, so as to form the gap between the first diffuser plate 11 and the second diffuser plate 12.

Figure 3:
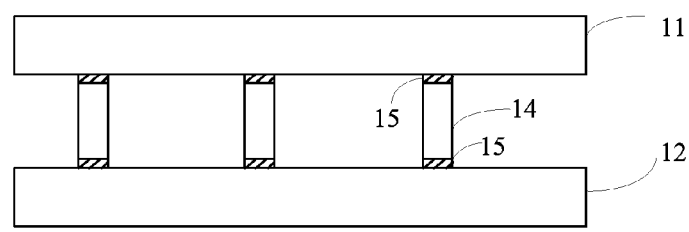
FIG. 3 is a schematic view showing the structure of the diffuser plate assembly according to one embodiment of the present invention.

As a specific embodiment of the present invention, as shown in FIG. 3, there may be provided at least one support 14 between the first diffuser plate 11 and the second diffuser plate 12, and the support 14 is used to separate the opposed surfaces (that is, the lower surface of the first diffuser plate 11 and the upper surface of the second diffuser plate 12) of the first diffuser plate 11 and the second diffuser plate 12, so as to form the gap.

As long as the upper end surface of the support 14 can be bonded with the lower surface of the first diffuser plate 11 and the lower end surface of the support 14 can be bonded with the upper surface of the second diffuser plate 12 so as to separate the lower surface of the first diffuser plate 11 and the upper surface of the second diffuser plate 12, the shape of the support 14 of the present invention is not limited. For example, the support 14 may be a cylindrical structure as shown in FIG. 5, or it may be a frustum-cone structure as shown in FIG. 6.

Preferably, the support 14 may be made of transparent material(s) to reduce the influences on the light due to the support 14.

It should be understood that when the support is placed between the first diffuser plate 11 and the second diffuser plate 12, there should not be a relative movement occurred between the support 14 and the first diffuser plate 11 and/or the second diffuser plate 12, so as to keep the first diffuser plate 11 and the second diffuser plate 12 stable.

As an specific embodiment of the present invention, as shown in FIG. 3, an adhesive material 15 may be provided between the first diffuser plate 11 and the support 14, and the first diffuser plate 11 and the support 14 are fixedly connected by using the adhesive material 15; and/or, the adhesive material 15 may be provided between the second diffuser plate 12 and the support 14, and the second diffuser plate 12 and the support 14 are fixedly connected by using the adhesive material 15. Preferably, as shown in FIG. 3, the adhesive material 15 can be provided between the first diffuser plate 11 and the support 14 and between the second diffuser plate 12 and the support 14, respectively. Preferably, the adhesive material 15 is made of transparent material(s), so as to prevent an influence on the light.

Figure 4:
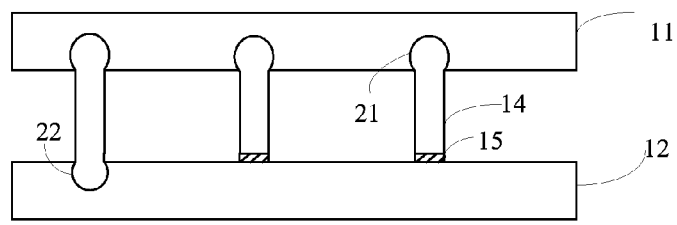
FIG. 4 is a schematic view showing the structure of the diffuser plate assembly according to another embodiment of the present invention.

As another embodiment of the present invention, as shown in FIG. 4, a first lock-in member 21 can be provided at the end of the support 14 corresponding to the first diffuser plate 11, and a first groove can be provided at a position of the first diffuser plate 11 corresponding to the first lock-in member 21, the first lock-in member 21 being extended and locked into the first groove; and/or a second lock-in member 22 can be provided at the end of the support 14 corresponding to the second diffuser plate 12, and a second groove can be provided at a position of the second diffuser plate 12 corresponding to the second lock-in member 22, the second lock-in member 22 being extended and locked into the second groove. In the present invention, the shape of the first lock-in member 21 and/or the second lock-in member 22 is not limited, as long as the lock-in members can be locked into the first groove and/or the second groove. For example, the first lock-in member 21 and the second lock-in member 22 may be a spherical shape, in such a case, the widest width of the first groove is adapted to the diameter of the first lock-in member 21, so that the first lock-in member 21 can be locked into the first groove tightly; the widest width of the second groove is adapted to the diameter of the second lock-in member 22, so that the second lock-in member 22 can be locked into the second groove tightly. Alternatively, the first lock-in member 21 and the second lock-in member 22 may be a dovetail connector, the first groove and the second groove are dovetail grooves, the dimensions of the dovetail grooves are adapted to those of the dovetail connectors, so that the first lock-in member 21 can be locked into the first groove tightly, and the second lock-in member 22 can be locked into the second groove tightly.

Preferably, the first lock-in member 21 can be provided at the end of the support 14 corresponding to the first diffuser plate 11, the adhesive material 15 can be provided at the end of the support 14 corresponding to the second diffuser plate 12, and the first groove can be provided at a position of the first diffuser plate 11 corresponding to the first lock-in member 21; or the adhesive material 15 can be provided at the end of the support 14 corresponding to the first diffuser 11, the second lock-in member 22 can be provided at the end of the support 14 corresponding to the second diffuser plate 12, and the second groove can be provided at a position of the second diffuser plate 12 corresponding to the second lock-in member 22. In those cases, the movements of the first lock-in member 21 and the second lock-in member 22 within the first groove and the second groove, respectively, are prevented compared with a case where both ends of the support 14 are provided with the first lock-in member 21 and the second lock-in member 22, respectively.

Furthermore, for the purpose of keeping a relative positioning relationship between the first diffuser plate 11 and the second diffuser plate 12 stable, there can be a plurality of supports 14 provided between the first diffuser plate 11 and the second diffuser plate 12, so as to keep the relative positioning relationship between the first diffuser plate 11 and the second diffuser plate 12 stable.

It should be understood that the number of supports 14 should be reasonable, that is, the opposed surfaces of the first diffuser plate 11 and the second diffuser plate 12 can be stably separated from each other by a plurality of supports 14, while the influence on the light caused by the supports 14 should be minimized. The number and arrangement of the supports 14 can be determined according to the size of the liquid crystal display panel. In a case where the size of the liquid crystal display panel is larger, the number of the supports 14 may be more. In a case where the size of the liquid crystal display panel is smaller, the number of the supports 14 may be less. For example, in a case where the size (the length of a diagonal line) of the liquid crystal display panel is not exceeding 55 inches, the supports 14 can be arranged as the arrangement shown in FIG. 7; in a case where the size of the liquid crystal display panel is exceeding 55 inches, the supports 14 can be arranged as the arrangement shown in FIG. 8, so as to keep a relative positioning relationship between the first diffuser plate 11 and the second diffuser plate 12 stable. The arrangements of the supports are not limited thereto.

It should be understood that in a case where the distance between the first diffuser plate 11 and the second diffuser plate 12 is too short, the distribution of the light will not be uniform due to a shorter reflection path; and in a case where the distance between the first diffuser plate 11 and the second diffuser plate 12 is too long, it will lead to the loss of the light due to a longer reflection path, and the thickness of the backlight will be increased as well. Preferably, the distance between the first diffuser plate 11 and the second diffuser plate 12 (i.e., the height of the gap) is ranged from 4 mm to 6 mm. Generally, the light sources located under the second diffuser plate 12 are 25 mm away from the second diffuser plate 12. In the diffuser plate assembly according to the present invention, both of the thicknesses of the first diffuser plate 11 and the second diffuser plate 12 are ranged from 2 mm to 3 mm, the distance between the light sources and the second diffuser plate 12 can be reduced due to the increased uniformity of the distribution of the light, therefore the backlight having a smaller thickness can be realized.

Generally, a diffusion film layer is provided on the upper surface of the first diffuser plate 11 to further improve the uniformity of the emergent light, however, since the uniformity of the light is improved in the diffuser plate assembly of the present invention compared with that in the prior art, the number of the diffusion film layers can be less. Thus, the probability of wrinkling of the diffusion film layers is decreased, and the quality of products is improved.

In the present invention, the light emitted from the light sources located under the second diffuser plate is diffused by the second diffuser plate and the first diffuser plate, and experiences a plurality of reflections within the gap between the second diffuser plate and the first diffuser plate, which enable the light to irradiate on the liquid crystal display panel more uniformly. On the other hand, compared with the prior art, the present invention can decreases the probability of wrinkling of the diffusion film layers, and a backlight comprising the diffuser plate assembly can have a smaller thickness; furthermore, a display device comprising the backlight can have a smaller thickness.

As another aspect of the present invention, there is provided a backlight. The backlight includes light sources and the diffuser plate assembly which is the one provided by the present invention as described above. The light sources are provided under the second diffuser plate of the diffuser plate assembly. The distance between the light sources and the second diffuser plate is shorter than that in the prior art, so that the backlight has a smaller thickness.

As still another aspect of the present invention, there is provided a display device. The display device includes the backlight provided by the present invention.

It should be understood that, the above embodiments are only exemplary embodiments for the purpose of explaining the principle of the present invention, and the present invention is not limited thereto. For a person skilled in the art, various improvements and modifications may be applied to the present invention without departing from the spirit and essence of the present invention. These improvements and modifications are also covered by the scope of the claims of the present invention.

What is claimed is:

1. A diffuser plate assembly, wherein the diffuser plate assembly includes a first diffuser plate and a second diffuser plate located under the first diffuser plate, and a gap is formed between the first diffuser plate and the second diffuser plate; wherein there is at least one support provided between the first diffuser plate and the second diffuser plate, and the support separates the opposed surfaces of the first diffuser plate and the second diffuser plate to form the gap; and wherein a first lock-in member is provided at the end of the support corresponding to the first diffuser plate, and a first groove is provided at a position of the first diffuser plate corresponding to the first lock-in member, the first lock-in member being extended and locked into the first groove; and/or a second lock-in member is provided at the end of the support corresponding to the second diffuser plate, and a second groove is provided at a position of the second diffuser plate corresponding to the second lock-in member, the second lock-in member being extended and locked into the second groove.

2. The diffuser plate assembly according to claim 1, wherein, the support is made of a transparent material.

3. The diffuser plate assembly according to claim 1, wherein, a plurality of the supports are provided between the first diffuser plate and the second diffuser plate.

4. The diffuser plate assembly according to claim 1, wherein, the height of the gap is ranged from 4 mm to 6 mm.

5. The diffuser plate assembly according to claim 1, wherein, a diffusion film layer is provided on the upper surface of the first diffuser plate.

6. A backlight including light sources and a diffuser plate assembly located above the light sources, wherein, the diffuser plate assembly is the diffuser plate assembly according to claim 1.

7. A display device including a backlight, wherein, the backlight is the backlight according to claim 6.

* * * * *